United States Patent [19]

Cherry

[11] 4,417,925
[45] Nov. 29, 1983

[54] CERAMIC FIBER REFRACTORY MIXTURE

[75] Inventor: Carl J. Cherry, King of Prussia, Pa.

[73] Assignee: Combustion Engineering, Inc., Windsor, Conn.

[21] Appl. No.: 368,798

[22] Filed: Apr. 16, 1982

[51] Int. Cl.$^3$ ................................................ C04B 9/04
[52] U.S. Cl. ........................................ 106/85; 501/95; 501/109; 501/111; 501/118
[58] Field of Search ............... 106/85; 501/95, 109, 501/111, 118

[56] References Cited

U.S. PATENT DOCUMENTS

| | | | |
|---|---|---|---|
| 3,835,054 | 9/1974 | Olewinski et al. | 501/95 |
| 4,048,134 | 9/1977 | Courtenay et al. | 501/118 |
| 4,089,692 | 5/1978 | Toeniskoetter et al. | 106/85 |

*Primary Examiner*—James Poer
*Attorney, Agent, or Firm*—William W. Habelt

[57] ABSTRACT

A dry, lightweight refractory mixture which can be shipped and stored in a dry form, but which becomes plasticized upon the addition of water to yield a moldable, air-setting, insulating refractory composition, the dry refractory mixture including from about 35 to about 70% by weight ceramic fiber; from about 10.5 to about 40% by weight setting agent, preferably a mixture of aluminum phosphate powder and calcined magnesia powder; from about 5 to about 20% by weight of dry, water-soluble, powdered resin binder prepared from urea formaldehyde or melamine formaldehyde, and from about 0.3 to about 2% by weight of dry, water-soluble, non-ionic, powdered organic polymer gelling and cohesion enhancing agent. The dry mixture also preferably includes from about 0.5 to about 2.0% by weight of a dry, water-soluble acidifying agent for catalyzing the air-setting of the plasticized composition.

12 Claims, No Drawings

CERAMIC FIBER REFRACTORY MIXTURE

BACKGROUND OF THE INVENTION

The present invention relates to refractory moldable compositions and, more particularly, to a dry, lightweight refractory mixture which upon the addition of water becomes plasticized to yield a moldable, air-setting, insulating refractory composition which may be readily formed into various ceramic objects.

Various lightweight, insulating ceramic fiber refractory compositions are available in preformed shapes, blankets, bricks and panels. These materials are frequently used in furnace interiors because their lightweight reduces heat storage and therefore conserves fuel and reduces furnace heat-up time. Unfortunately, the use of such refractory compositions is limited to relatively simple shapes and to applications such as lining industrial furnaces and the like.

To complement such ceramic fiber refractory products of definite dimensions, wet, moldable insulating refractory compositions consisting of ceramic fiber, a thickening agent, and adhesion enhancing agent, and a liquid vehicle carrier have been developed. Wet, moldable insulating refractory compositions of such a type are molded into the desired shape in-place in the desired location. The liquid vehicle carrier is then evaporated from the moldable refractory composition with heated air so as to set the refractory composition in its final shape. It is necessary that moldable refractory compositions of this type be non-setting at ambient air temperatures because such moldable refractory compositions are produced, shipped and stored in a wet form containing the liquid vehicle carrier.

It is therefore an object of the present invention to provide a dry, lightweight refractory mixture which can be shipped and stored in a dry form, but which becomes plasticized upon the addition of a liquid vehicle, such as water, to yield a moldable, air-setting, insulating refractory composition.

It is a further object of the present invention to provide a dry, lightweight refractory mixture which upon the addition of water yields a moldable composition which air-sets within a relatively short period, such as eight hours, but remain readily moldable after mixing with water for sufficient working time to permit troweling, tamping, ramming and other forming operations to be performed prior to setting.

SUMMARY OF THE INVENTION

In accordance with the present invention, there is provided a dry, lightweight refractory mixture comprising from about 35 to about 70% by weight ceramic fiber; from about 10.5 to about 40% by weight setting agent, preferably a mixture of aluminum phosphate powder and calcined magnesia powder; from about 5 to about 20% by weight of dry, water-soluble, powdered resin binder from the group consisting of solid resin binders prepared from urea formaldehyde, melamine formaldehyde, and mixtures thereof; from about 0.3 to about 2% by weight of dry, water-soluble, non-ionic, powdered organic polymer gelling and cohesion enhancing agent.

The dry, lightweight refractory mixture of the present invention may also include from about 0.5 to about 2% by weight of dry, water-soluble acidifying agent for catalyzing the air-setting of the plasticized composition. Preferably, the acidifying agent has a pH in aqueous solution in the range of about 1.5 to about 2.0. Suitable acidifying agents include, but are not limited to, citric acid, oxalic acid, sulfamic acid, ammonium chloride, ammonium sulfate, ammonium amino sulfamate, magnesium chloride, magnesium sulfate and phosphorous pentoxide. A preferred compensation for the dry, lightweight refractory mixture of the present invention consists essentially of 59.58% by weight aluminum silicate ceramic fibers, about 19.86% by weight aluminum phosphate powder, about 5.96% by weight calcined magnesia, about 12.91% by weight powdered urea formaldehyde resin binder, about 0.99% by weight powdered polyethylene oxide homopolymer, and about 0.7% by weight ammonium chloride salt.

DETAILED DESCRIPTION

A better understanding of the invention will be obtained from the following detailed description of the ceramic fiber refractory mix and its ingredients.

The dry, lightweight refractory mixture of the present invention contains a ceramic fiber, a plasticizer, a plastic binder, setting agents and a setting catalyst. Upon the addition of water, the dry, lightweight refractory mixture of the present invention becomes plasticized to yield a highly moldable, air-setting insulated refractory composition that can be easily fabricated into lightweight refractory articles particularly suitable for use in high temperature environments. Because of the high moldability of the composition resulting from the addition of water to the dry mixture of the present invention, the composition can be troweled, tamped, rammed or otherwise formed into any desirable shape or object. The resulting composition can also be used to fill holes or crevices in refractory walls such as furnace liners.

The dry, lightweight refractory mixture of the present invention contains the following ingredients wherein the preferred composition range is recited.

| Ingredient | Composition Range % by Weight |
| --- | --- |
| Ceramic fiber | 35–70 |
| Setting agent | 10.5–42 |
| Water-soluble binder | 5–20 |
| Plasticizing agent | 0.3–2 |
| Acidifying agent | 0–2 |

The major component of the dry, lightweight refractory mixture of the present invention is ceramic fiber which may be present in an amount of from about 35 to about 70% by weight of the mixture. Although any refractory ceramic fiber may be employed in the mixture of the present invention, the ceramic fiber is preferably selected from the group consisting of alumina fibers, aluminum silicate fibers, chrome-containing fibers, and mixtures thereof, with fibers of aluminum silicate being the most preferred of this group. Ceramic fibers of this grouping are readily commercially available and are sold, for example, by Combustion Engineering, Inc. under the trademark CER-WOOL, by the Babcock and Wilcox Company under the trademark KAOWOOL, by the Carborundum Company under the trademark FIBERFRAX and by Johns-Manville, Inc. under the trademark CERAWOOL.

Although the refractory ceramic fiber composition is unimportant to the essence of the invention, it is important from an application standpoint. That is, a particular ceramic fiber may be suitable for only a limited temperature range. One type of ceramic fiber may be preferred for very high temperature applications, while a different less expensive ceramic fiber may be suitable for lower temperature applications. Additionally, the nature of the ceramic fiber used influences the amount of plasticizer and binder required within the permissible composition range. A very dense, low surface area ceramic fiber will require less plasticizer and binder simply because there is less surface area to be bound. On the other hand, a low density, high surface area ceramic fiber would require more plasticizer and binder because of the increased surface area to be bound.

The second most abundant ingredient by bulk is the setting agent which may be present in an amount of from about 10.5 to about 42% by weight. The purpose of the setting agent is to provide an air-setting mechanism at ambient temperature to harden the refractory object formed. The preferred setting agent is a mixture of two components: aluminum phosphate powder and calcined magnesia powder. The permissible range of composition for a dry, lightweight refractory mixture containing aluminum phosphate and calcined magnesia as the setting agent is given as follows.

| Ingredient | Composition Range % by Weight |
|---|---|
| Ceramic fiber | 35-70 |
| Aluminum Phosphate powder | 8-32 |
| Calcined Magnesia | 2.5-10 |
| Water-soluble binder | 5-20 |
| Organic Polymer Plasticizing agent | 0.3-2 |
| Acidifying agent | 0-2 |

The aluminum phosphate provides one air-setting mechanism for setting the water-soluble binder by supplying the acid medium essential for room temperature hardening to occur. The preferred form of aluminum phosphate is a commercially available mixture of 44% phosphorous pentoxide, 11% alumina and inerts, sold under the product name Phostra 10 by GIULINI CHEMIE GMBH of LUDWIGSHAFEN AM RHEIN, WEST GERMANY.

The calcined magnesia also provides a setting mechanism in an aqueous, acidic medium. Calcined magnesia is a commercially available commodity sold in bags or bulk such as that sold by Basic Inc. under the product name DB 98 magnesia. The most important characteristic of the powdered calcined magnesia as a setting agent is the degree of calcination which determines the hydration resistance, or conversely, the reactivity of the magnesia. A highly calcined magnesia is most desirable.

The two setting agents, aluminum phosphate and calcined magnesia, synergistically provide an additional setting mechanism. The aluminum phosphate reacts with the magnesia upon the addition of water to the dry mixture to form waterinsoluble aluminum magnesium phosphate and thereby hasten the air-setting mechanism at ambient air temperature. As indicated in the above table, the weight ratio of aluminum phosphate to calcined magnesia ranges from 0.8 to 1.0 (8% aluminum phosphate to 10% calcined magnesia) to about 12.8 to 1.0 (32% aluminum phosphate to 2.5% calcined magnesia).

The third necessary ingredient of the dry, lightweight refractory mixture of the present invention is an organic polymer plasticizing agent which may be present in an amount from about 0.3 to about 2% by weight of the dry mixture. The organic polymer acts as a plasticizing agent to gel and impart cohesiveness to the wet mass formed upon the addition of water to the dry mixture thereby facilitating consolidation of the wet mass into a rammable or trowelable mixture for molding into ceramic objects. The water-soluble plasticizing agent may be any of a number of nonionic, organic polymers and is preferably selected from the group consisting of solid organic polymers prepared from polyethylene oxide, methylcellulose, carboxymethylcellulose, cereal starches, and mixtures thereof. The preferred plasticizing agent from this group is polyethylene oxide homopolymer.

The fourth necessary ingredient of the dry, lightweight refractory mixture of the present invention is a water-soluble binder which may be present in the amount of from about 5 to about 20% by weight of the mixture and selected from the group consisting of solid resin binders prepared from urea formaldehyde, melamine formaldehyde, and mixtures thereof. The preferred water-soluble binder for the dry mixture of the present invention is powdered, neat urea formaldehyde resin.

In addition to the aforementioned ingredients, it is preferred to add a dry powdered acidifying agent to the dry mixture of the present invention in an amount of from about 0.5 to about 2% by weight of the mixture. The acidifying agent serves to catalyze the set of the urea formaldehyde resin at ambient air temperature. Preferably, the acidifying agent has a pH in aqueous solution of about 1.5 to about 2.0 so as to provide the desirable slower set to permit efficient working time to mold the wet mass formed upon the additional water to the dry mixture of the present invention into the desired shape. The use of stronger acidifying agents may cause the mass to set too rapidly.

The acidifying agent for catalyzing the air-setting of the plasticized mass formed upon addition of water to the dry, lightweight refractory mix of the present invention may be any weak acid or acid salt exhibiting the proper acidity in an aqueous solution. Preferably the acidifying agent is either an organic acid selected from the group consisting of citric acid, oxalic acid, sulfamic acid, and mixtures thereof or an acid salt selected from the group consisting of ammonium chloride, ammonium sulfate, ammonium amino sulfamate, magnesium chloride, magnesium sulfate, phosphorous pentoxide, and mixtures thereof. The most preferred acidifying agent is an ammonia acid salt selected from the group consisting of ammonium chloride, ammonium sulfate, ammonium amino sulfamate, and mixtures thereof. Ammonium acid salts are preferred because of the buffering effect the ammonium ion has on the urea formaldehyde resin which is the preferred binder. Additionally, ammonium nitrate could also be used as an acidifying agent however it has a serious drawback of being an explosive. Further, ammonium flouride could also be used as the acidifying agent but its use could be environmentally objectionable.

A preferred composition for the dry, lightweight refractory mixture of the present invention consists essentially of 59.58% by weight aluminum silicate ceramic fibers, about 19.86% by weight aluminum phosphate powder, about 5.96% by weight calcined magnesia, about 12.91% by weight powdered urea formaldehyde resin binder, about 0.99% by weight powdered organic polymer prepared from polyethylene oxide, and about 0.7% by weight ammonium chloride salt.

A particular advantage of the present invention is that the moldable composition resulting from the addition of water to the dry, lightweight refractory mix of the present invention is air-setting at ambient air temperature. Further, the resulting composition progressively air-sets over a period of about 8 hours sufficiently enough to permit stripping and handling of the refractory article, while at the same time maintaining its moldability long enough to permit molding and forming of the refractory article. Additionally, the air-set refractory article may be dried further overnight in an oven at about 110 C. to remove additional water from the air-set article. Also, because of its dry nature, the lightweight refractory mix of the present invention can be shipped and stored in bags and easily handled. Because of its lightweight, only about 31 pounds per cubic foot, and its bulk composition of ceramic fiber the resultant refractory article will have low thermal conductivity.

I claim:

1. A dry, lightweight refractory mixture, which becomes plasticized upon the addition of water to yield a moldable, air-setting, insulating refractory composition, comprising:
   a. from about 35 to about 70% by weight ceramic fiber;
   b. from about 10.5 to about 40% by weight setting agent for providing an air-setting mechanism whereby the refractory composition will harden at ambient temperature upon the addition of water;
   c. from about 5 to about 20% by weight of dry, watersoluble, powdered resin binder from the group consisting of solid resin binders prepared from urea formaldehyde, melamine formaldehyde, and mixtures thereof;
   d. from about 0.3 to about 2% by weight of dry, watersoluble, nonionic, powdered organic polymer plasticizing agent for gelling and imparting cohesiveness to the plasticized composition.

2. A dry, lightweight refractory mixture as recited in claim 1 further comprising from about 0.5 to about 2% by weight of dry, water-soluble acidifying agent for catalyzing the air-setting of the plasticized composition.

3. A dry, lightweight refractory mixture as recited in claim 1 or 2 wherein the ceramic fiber is selected from the group consisting of alumina fibers, aluminum silicate fibers, chrome-containing fibers, and mixtures thereof.

4. A dry, lightweight refractory mixture as recited in claim 1 or 2 wherein the setting agent consists of a mixture of aluminum phosphate and calcined magnesia.

5. A dry, lightweight refractory mixture as recited in claim 4 wherein the setting agent consists of aluminum phosphate and calcined magnesia in a weight ratio ranging from about 0.8 to 1.0 to about 12.8 to 1.0.

6. A dry, lightweight refractory mixture as recited in claim 1 or 2 wherein the dry, water-soluble, nonionic, powdered organic polymer plasticizing agent is selected from the group of solid organic polymers consisting of polyethylene oxide, methylcellulose, carboxymethylcellulose, cereal starch, and mixtures thereof.

7. A dry, lightweight refractory mixture as recited in claim 1 or 2 wherein the dry, water-soluble, nonionic, powdered organic polymer plasticizing agent is a solid organic polymer prepared from polyethylene oxide.

8. A dry, lightweight refractory mixture, which becomes plasticized upon the addition of water to yield a moldable, air-setting, insulating refractory composition, comprising:
   a. from about 35 to about 70% by weight ceramic fibers selected from the group consisting of aluminum fibers, aluminum silicate fibers, chrome-containing fibers, and mixtures thereof;
   b. from about 8 to about 32% by weight aluminum phosphate powder;
   c. from about 2.5 to about 10% by weight calcined magnesia;
   d. from about 5 to about 20% by weight of dry, water-soluble, powdered resin binder selected from the group consisting of solid resin binders prepared from urea formaldehyde, melamine formaldehyde, and mixtures thereof;
   e. from about 0.3 to about 2% by weight of dry, water-soluble, nonionic, powdered organic polymer plasticizing agent selected from the group of solid organic polymers consisting of polyethylene oxide, methylcellulose, carboxymethyl-cellulose, cereal starch, and mixtures thereof; and
   f. from about 0.5 to about 2% by weight of dry, water-soluble acidifying agent for catalyzing the air-setting of the plasticized composition.

9. A dry, lightweight refractory mixture as recited in claim 2 or 8 wherein the dry, water-soluble acidifying agent for catalyzing the air-setting of the plasticized composition has a pH in aqueous solution in the range of about 1.5 to about 2.0.

10. A dry, lightweight refractory mixture as recited in claim 2 or 8 wherein the dry, water-soluble acidifying agent for catalyzing the air-setting of the plasticized composition is an acid salt selected from the group consisting of ammonium chloride, ammonium sulfate, ammonium amino sulfamate, and mixtures thereof.

11. A dry, lightweight refractory mixture as recited in claim 2 or 8 wherein the dry, water-soluble acidifying agent for catalyzing the air-setting of the plasticized composition is an organic acid selected from the group consisting of citric acid, oxalic acid, sulfamic acid, and mixtures thereof.

12. A dry, lightweight refractory mixture, which becomes plasticized upon the addition of water to yield a moldable, air-setting, insulating refractory composition, consisting essentially of:
   a. about 59.58% by weight aluminum silicate ceramic fibers;
   b. about 19.86% by weight aluminum phosphate powder;
   c. about 5.96% by weight calcined magnesia;
   d. about 12.91% powdered urea formaldehyde resin binder;
   e. about 0.99% by weight powdered polyethylene oxide, homopolymer; and
   f. about 0.7% by weight ammonium chloride salt.

* * * * *